(12) United States Patent
Karidis et al.

(10) Patent No.: US 7,614,011 B2
(45) Date of Patent: Nov. 3, 2009

(54) APPARATUS AND METHOD FOR DISPLAY POWER SAVING

(75) Inventors: John Peter Karidis, Ossining, NY (US); Clifford Alan Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 10/970,303

(22) Filed: Oct. 21, 2004

(65) Prior Publication Data

US 2006/0087502 A1   Apr. 27, 2006

(51) Int. Cl.
*G06F 3/048* (2006.01)
*G06F 3/01* (2006.01)

(52) U.S. Cl. ............... 715/789; 715/802; 715/811; 715/821; 715/823; 715/824; 715/828; 345/90; 345/212; 345/214

(58) Field of Classification Search ............ 715/789, 715/802, 811, 821, 823–824, 828; 345/90, 345/212, 214
See application file for complete search history.

(56) References Cited

U.S. PATENT DOCUMENTS

| | | | | |
|---|---|---|---|---|
| 5,822,599 A * | 10/1998 | Kidder et al. | ............... | 713/324 |
| 5,881,299 A * | 3/1999 | Nomura et al. | ............. | 713/324 |
| 5,991,546 A * | 11/1999 | Chan et al. | .................... | 710/62 |
| 6,205,318 B1 * | 3/2001 | Schindler et al. | ........... | 455/3.06 |
| 6,342,908 B1 * | 1/2002 | Bates et al. | ................. | 715/798 |
| 6,574,629 B1 * | 6/2003 | Cooke et al. | .................. | 707/10 |
| 6,801,811 B2 * | 10/2004 | Ranganathan et al. | ......... | 700/22 |
| 6,900,798 B2 * | 5/2005 | Heie | .......................... | 345/211 |
| 6,912,664 B2 * | 6/2005 | Ranganathan et al. | ....... | 713/320 |
| 6,934,772 B2 * | 8/2005 | Bui et al. | ...................... | 710/14 |
| 7,002,593 B2 * | 2/2006 | Milch et al. | ................. | 345/589 |
| 7,036,025 B2 * | 4/2006 | Hunter | ....................... | 713/300 |
| 2003/0009654 A1 * | 1/2003 | Nalawadi et al. | ............... | 713/1 |
| 2003/0009705 A1 * | 1/2003 | Thelander et al. | ........... | 713/340 |

* cited by examiner

*Primary Examiner*—Steven B Theriault
*Assistant Examiner*—Nicholas Augustine
(74) *Attorney, Agent, or Firm*—Keusey, Tutunjian & Bitetto, P.C.; Brian Verminski, Esq.

(57) ABSTRACT

A power saving method for self-luminous displays and an apparatus thereof, comprises determining active and inactive portions of a display screen. The inactive portions of the display screen are modified in accordance with criteria to save power by reducing energy consumption of the inactive portions while the active portions remain powered.

51 Claims, 8 Drawing Sheets

APPARATUS AND METHOD FOR DISPLAY POWER SAVING

BACKGROUND OF THE INVENTION

1. Field of the Invention

The present invention relates to display technology, and more particularly to a system and method for saving power in displays.

2. Description of the Related Art

Organic Light-Emitting Diode (OLED) displays have become increasingly available. An OLED is an electronic device made by placing a series of organic thin films between two conductors. When electrical current is applied, a bright light is emitted in a process called electrophosphorescence. OLED technology can be used to produce self-luminous displays that do not require backlighting. These properties result in thin, compact displays with wide viewing angle. The power consumption of these and other self-luminous displays is roughly proportional to the number and brightness of illuminated pixels. This is in contrast to backlit Liquid Crystal Displays (LCDs), which require a constant backlight to illuminate the entire rear of the panel even if few or no pixels are illuminated for the user.

Power savings for battery-driven devices is a crucial concern for users of such devices.

OLED and other computer display technology makes it possible to address and turn off individual pixels in order to save power. It would be advantageous to provide a system and method for controlling which pixels to energize and which to turn off in a way that preserves performance, yet significantly reduces power requirements.

SUMMARY OF THE INVENTION

A power saving method for self-luminous displays and an apparatus thereof, comprises determining active and inactive portions of a display screen. The inactive portions of the display screen are modified in accordance with criteria to save power by reducing energy consumption of the inactive portions while the active portions remain powered.

A program storage device readable by machine, tangibly embodying a program of instructions executable by the machine to perform method steps for power saving in self-luminous displays may be employed.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

A system and method are included for determining which areas of a screen to dim or turn off to save power while permitting a user to continue working or viewing areas or greater importance or activity. Such power-savings methods may be applied to displays for watches, computers, kiosks, head-mounted displays, and larger displays such as may be used on a street during periods of power constraints, etc.

Similarly, these methods may be applied to critical, emergency equipment (e.g. road signs, medical equipment, etc.) in which power is about to be lost or has been reduced such that working with a degraded or partial display is better than no display at all. Note that some of these concepts may provide an interesting user interface, regardless of power savings. For example, if areas of the display change brightness according to various criteria, such as a user's history of use, etc., this may have user interface benefits.

Note that in emergency situations, even ten seconds of extra battery life, such as may be provided by showing the edges of displayed objects instead of the entire object on a medical display device or aerospace display, could have significant value. For example, the additional time may permit a user to save a file or close an application, which could otherwise be lost due to degradation or failure of the power source.

Figure 1:
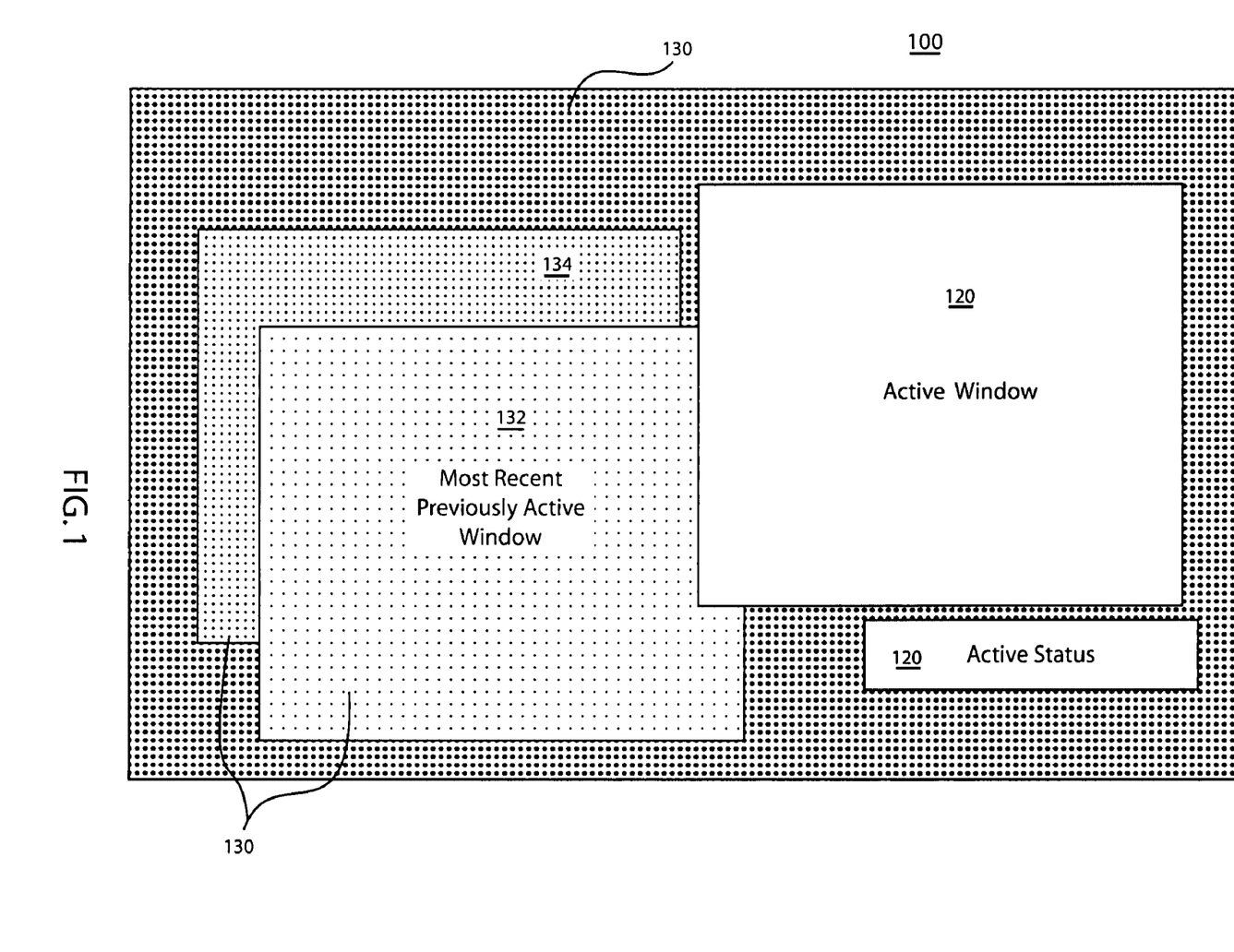
FIG. 1 is a diagram showing a display screen with active and inactive areas in accordance with one embodiment of the present invention.

Referring now in detail to the figures in which like numerals represent the same or similar elements and initially to FIG. 1, a display 100 in accordance with the present invention preferably includes a self-luminescent display, for example an electroluminescent display. While the present invention wilt be described in terms of a self-luminescent display, other displays types may also benefit from the teachings of the present invention, Display 100 may include, e.g., an organic light emitting diode display (OLED). FIG. 1 shows display 100 with an active region 120 that is turned on. Regions of the display 130 outside the active region 120 are maintained at a lower intensity (dim) or completely off.

In accordance with one aspect of the present invention, areas 130 of display 100 are selectively turned off in accordance with predetermined criteria. For example, an active window 120 on display 100 may be at a highest intensity/brightness during interaction therewith. While a previously active window 132, may be dimmer, and a window employed even earlier 134 may be even dimmer or completely off. The display 100 may be part of a device with one or more self-luminous displays.

Selective modification of "active" 120 and "inactive" 130 regions of a display are provided to save power given criteria for determining size, shape, and location of active and inactive regions to achieve user satisfaction and power savings. The active regions 120 maintain the default or user-specified display characteristics (e.g. normal brightness) and the inactive regions 130 are modified to reduce power dissipation by reducing the number or brightness of illuminated pixels in the inactive regions.

The active regions 120 may include active windows, status bars GUI elements, cognitive focus areas on display (e.g. center of user attention) as determined by one or more sensors, area in the center of the screen, area near cursor-insertion point, area near pointing cursor location, and the inactive regions are all other regions of the screen.

The active regions 120 may be brighter than the inactive regions. This is illustratively depicted based on stipple density in FIG. 1. A user satisfaction level may help to determine how and where to position active regions. This satisfaction may be determined by user preference profiles, biometrics, and surveys, which can be stored in a system profile or set as a default at the manufacturer.

Figure 2:
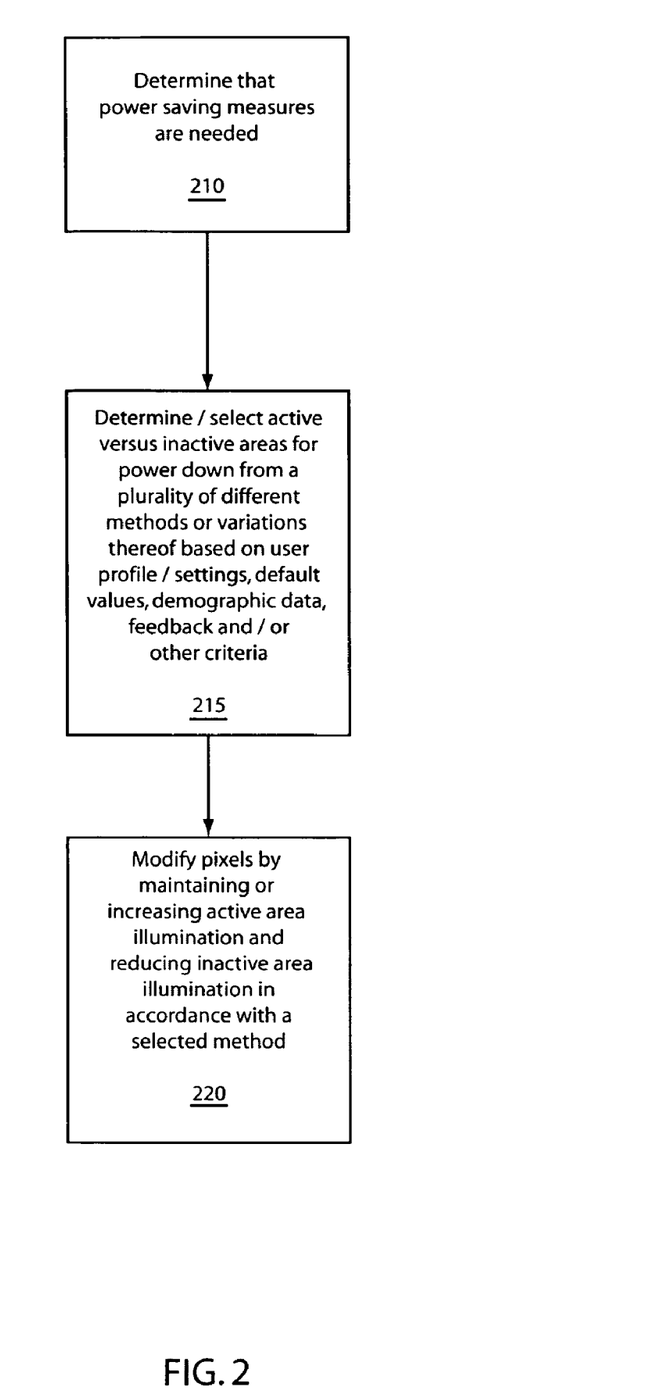
FIG. 2 is a block/flow diagram for a system/method for determining active/inactive areas and modifying the same in accordance with a plurality of methods of the present invention.

Referring to FIG. 2, a flow diagram shows steps for selectively modifying portions of a screen/display in accordance with one embodiment of the present invention. In an illustrative example, in block 210, a system may determine that power needs to be saved or can be saved. This decision may be based on predetermined criteria, such as an elapsed amount of time of say, nonuse, power conditions available, types of usage, manually set power down conditions, etc.

Figure 3:
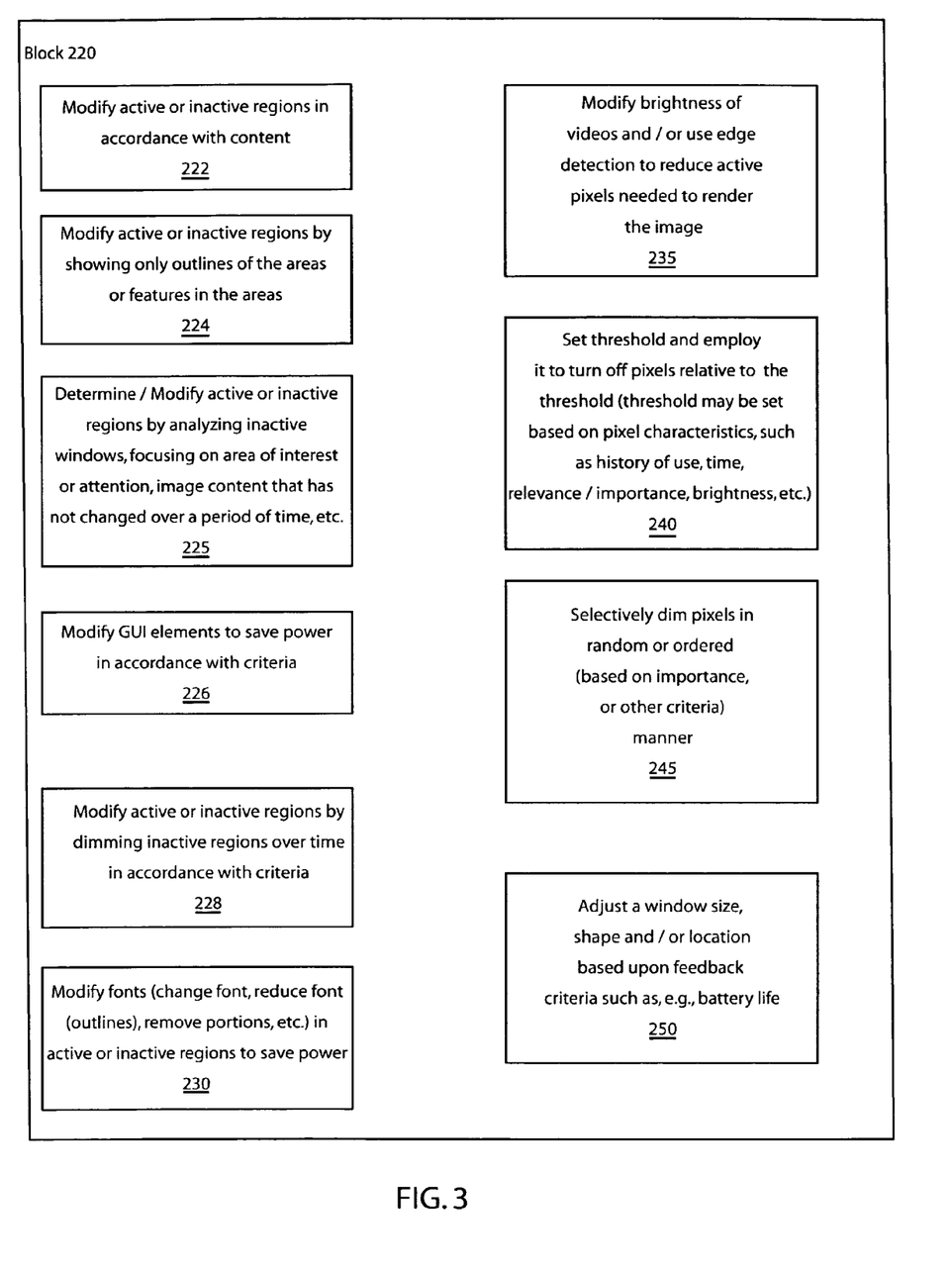
FIG. 3 is a block/flow diagram showing a plurality of pixel modification methods in accordance with the present invention.

It should be understood that the elements shown in FIGS. 2 and 3 may be implemented in various forms of hardware, software or combinations thereof. Preferably, these elements are implemented in a combination of hardware and software on one or more appropriately programmed general-purpose digital computers or equivalent having a processor and memory and input/output interfaces.

In block 215, a determination of active and inactive regions is performed, which involves the identification of a method of selective power down to implement. The selection of the type of power down method may be based upon a user-selected method or a default method. Alternately, a method may be selected by a computer system or the display system based upon feedback of current conditions. For example, in a battery operated self-luminescent display, stored power may be running low. The system therefore begins a power down process by a selected method of power reduction. In a first instance, an active region is illuminated while other regions are dimmed or pixels in those regions are switched off completely. As power runs lower, a rectangular or circular region 321 (FIG. 4) of say, a portion of the active area of the screen remains energized (See FIG. 4).

The active region's size, shape, location, and brightness may depend on remaining power. For example, 30% remaining power may display a rectangular region of interest and 20% may display a circular region 321 of interest (see e.g., FIG. 4). The preferred focus area (active region location) may be determined by any of, for example, mouse location, biometrics, eye gaze, and brain waves. These methods may be employed separately or in combination.

Figure 4:
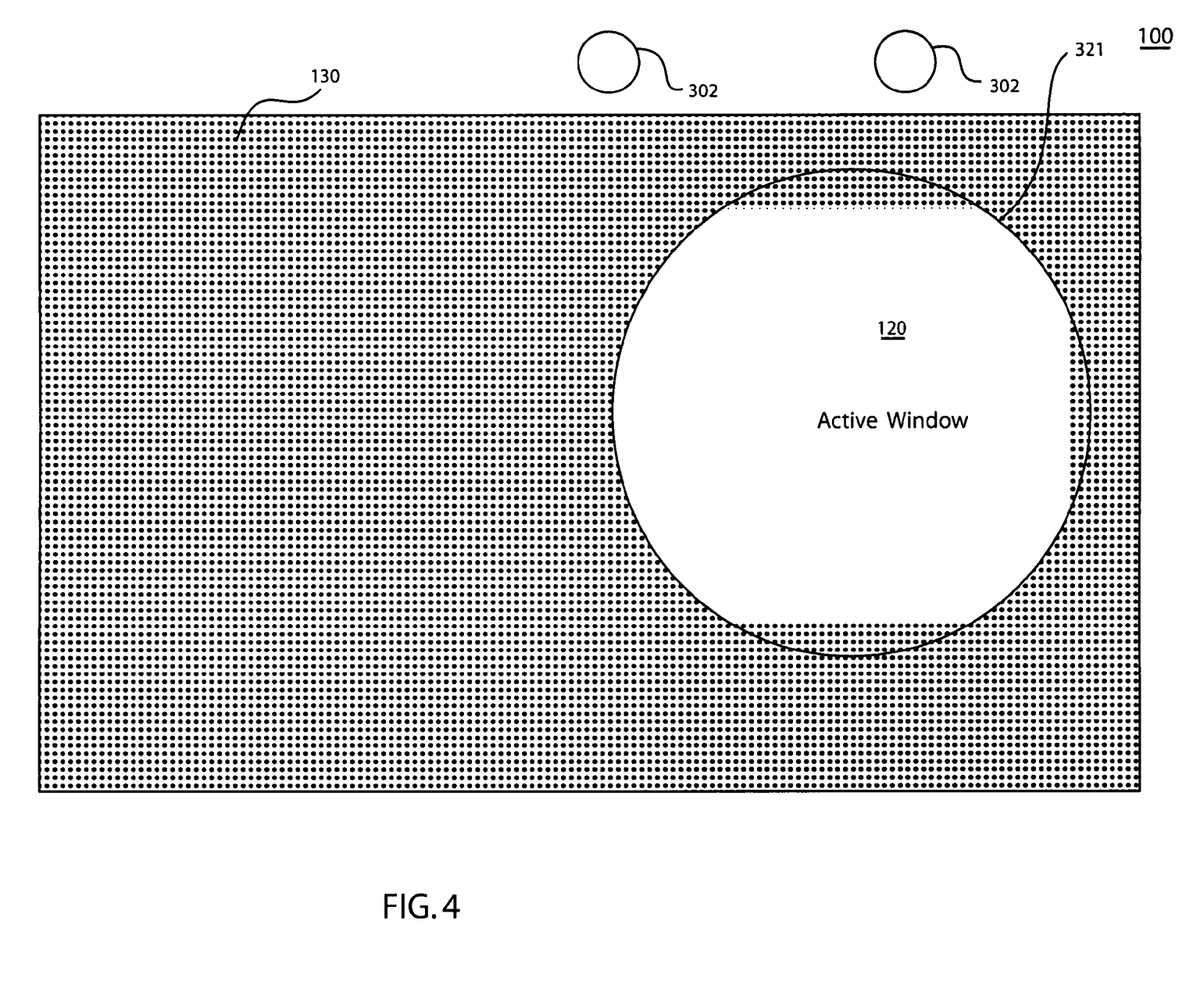
FIG. 4 is a diagram showing a region of interest/focus shaped as a circle bounding the active area in accordance with one illustrative embodiment of the present invention.

Referring to FIG. 4, other examples may include a cognitive focus area on display (e.g., a portion of a display where the user has focused their attention) as determined by one or more sensors 302. Sensors 302 may be based on eye gaze (reflections from the eyes determine where the user is working relative to the screen). Sensors 302 may be included in display screen 100 or located outside or adjacent to screen 100. In other embodiments, sensors 302 may be adapted to receive feedback energy based on biometric measurements (e.g., head or eye location and size, etc.), brain waves or other feedback information.

Figure 5:
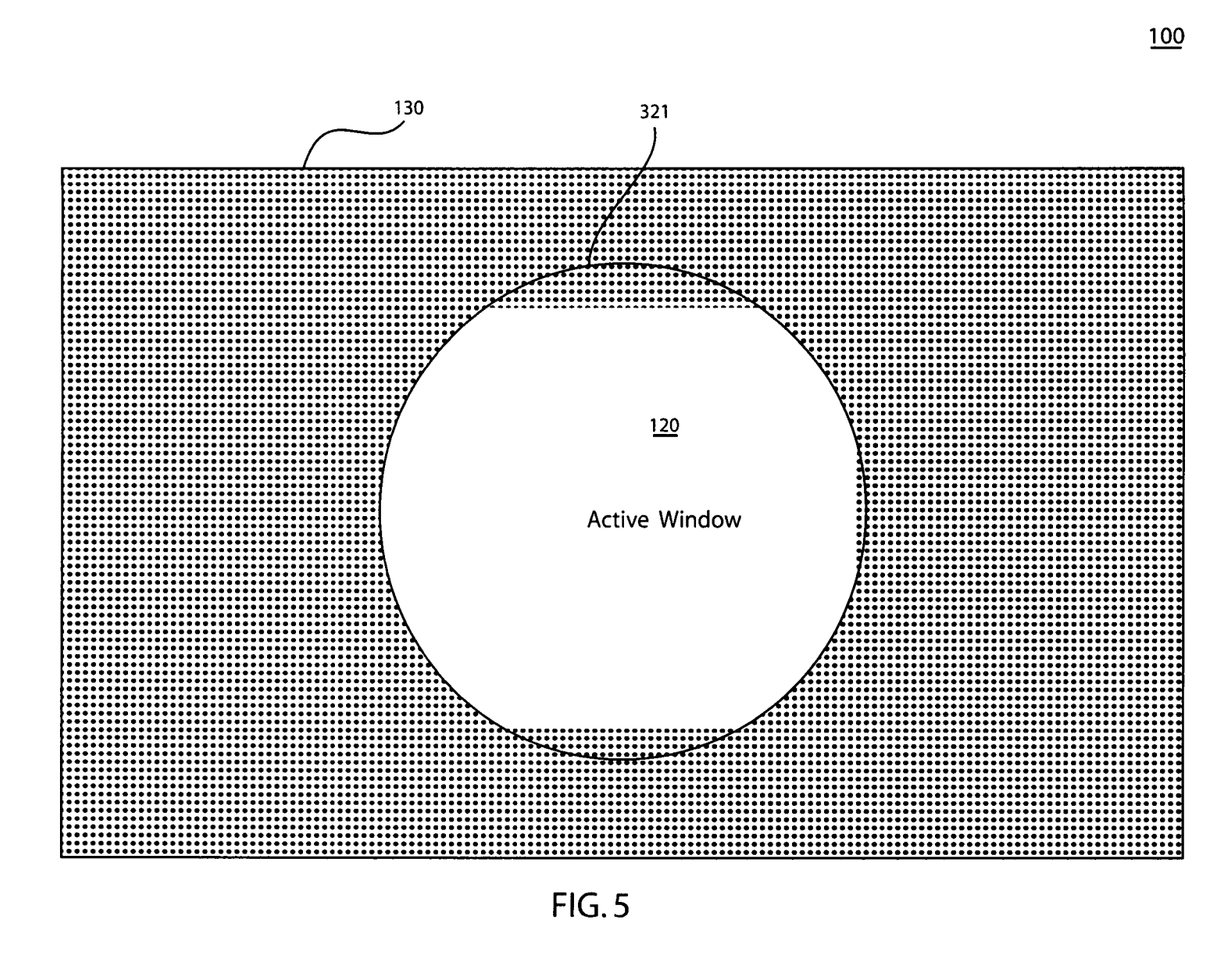
FIG. 5 is a diagram showing a region shaped as a circle located in a predetermined area (e.g., screen center) bounding the active area in accordance with one illustrative embodiment of the present invention.
Figure 6:
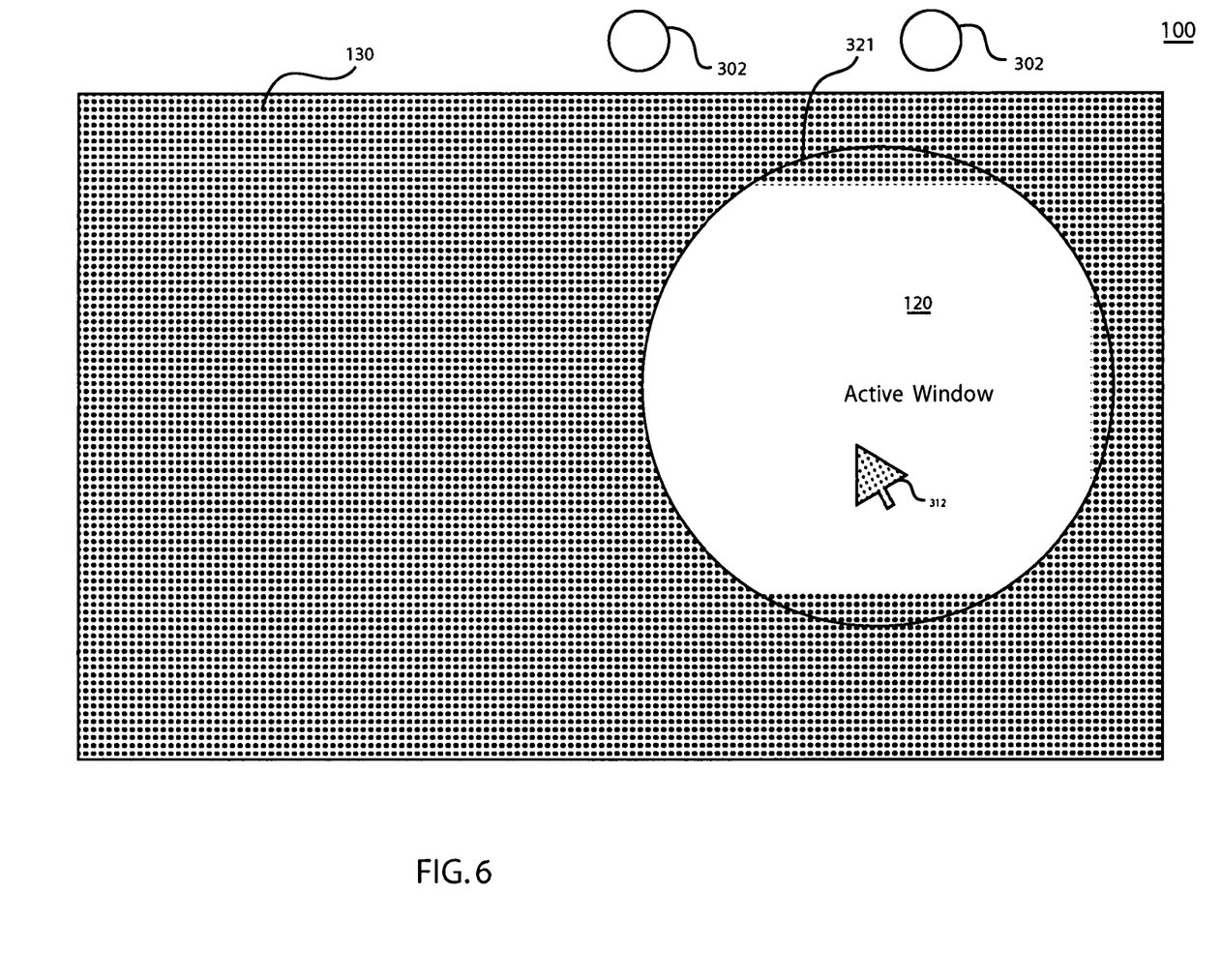
FIG. 6 is a diagram showing a moveable circle region controlled by cursor or pointer movement and bounding the active area in accordance with one illustrative embodiment of the present invention.

Referring to FIGS. 5 and 6, other methods may include creating active regions based upon areas of screen geometry or cursor location. For example, an area in the center of the screen may be maintained in an active state (FIG. 5). An active area 120 may be maintained at a predetermined distance and shape for a cursor-insertion point, or area near a pointing cursor location 312, etc. (FIG. 6).

The active region may be under mouse-control (e.g. like a periscope's circular or rectangular aperture) that the user moves around the screen and where the inactive regions outside of the circle are darkened. This feature may be useful in several scenarios. For example, the user may suddenly realize that his battery will fail completely in 10 minutes. The system then gives the user the option of using a circular aperture (like a periscope), which he can move around the display with a mouse, so that only a circular region is active while the rest of the screen is black (or nearly black). This gives users a power savings while also allowing users to focus on a region of interest. Although the power saving may be small, if this feature allows users to save some precious work or complete an important task, this can be very valuable.

Referring again to FIG. 2, in block 220, the active region is illuminated and the inactive region is dimmed, reduced or turned off in accordance with selected power down method or methods. A plurality of different power reduction methods may be selected for use alone or in combination with other methods. The extent of reduction is preferably based on illumination of active areas and reducing or eliminating illumination in inactive areas. The methods selected may be based on default settings, user selected settings, feedback conditions, or other criteria.

Referring to FIG. 3, a plurality of exemplary methods for reducing inactive area illumination or power is illustratively shown for block 220. In one embodiment, the extent of the active regions may be dependent on the type of content. For example, in step 222 the system may determine that it is useful to illuminate portions based on content. For example, an instant-message window with the content of "computers" may be active but other regions of the screen including browser windows with other content are turned off. The active region may be an integral number of characters, words, sentences or text lines near a cursor or center of focus.

In some cases, in block 224, the active area may show only edges or outlines of windows, which can be accomplished using an edge-detection algorithm to show only edges in stills or animations to save power. Other graphic representations or indicators may also be employed so that a user can reactivate a window or area of a screen should the need arise.

In block 225, inactive areas may be determined by an analysis of inactive windows, areas far from the center of the screen, areas far from the center of attention, areas with static image content that has not changed in a long time. For example, if a user has not looked at or interacted with a particular window, it may dim. In block 226, window graphical user interface (GUI) elements may be changed to save power. For example, a big icon in the shape of a button may be displayed as small text. The GUI element change may comprise:

fading/omission of title bar, frame, or scroll bar. Title bars can be rendered as an illuminated outline, dotted line or reduced pixel image. Icons can be shrunk.

In block 228, different inactive regions may be distinguished based on the most recent activity. For example, windows that have not been used over a predetermined threshold amount of time may be completely inactivated in the display. Other windows may begin to fade or dim over time. Still others may be closed automatically.

In block 230, a power-savings font may be used to reduce power within or outside of active area. The power-savings font may include reducing the brightness of selected text content in a given area, reducing intensity of illuminated pixels in a font, reducing line width of the font, eliminating features of the font (e.g., serifs), switching fonts, replacing large fonts with outline fonts, applying a stipple pattern to turn off some fraction of the lit pixels. The selected font may optimize power saving by changing to another font when battery power is low (e.g. switch from a heavier weight font to a lighter weight font), degrading font (e.g. removing serifs or other parts of letters), or reducing font size.

Font changes should also consider dark text/light background versus dark background/light text scenarios. For example, if a battery is low, say 10% or less power, light backgrounds with dark text may shift to dark background and light text. Font size, shape and/or detail may also be adjusted to reduce illuminated pixels.

In block 235, the overall average brightness of animated video content may be reduced by edge detection filters, alone or in combination with partial brightness reduction, or by de-emphasizing areas by reducing the brightness based on location or distance from the screen center. The brightness of graphics content may be reduced (e.g., reduced brightness alone or with edge enhancement or edge detection filter).

Brightness of graphics in images and text may be reduced in a plurality of ways. Assuming, for example, the text is dark on a light background, a reverse situation may be considered where the text is bright on a dark background. This may be applied to images, GUI elements and other graphical renderings. Similarly, the text, image or background color may be switched from say white to green or another color to save energy. Other techniques may include adjusting contrast, size or font to increase the boldness/linewidth to reduce the total number of illuminated pixels.

In block 240, a threshold value may be set in which all values beneath (or above in some cases) the threshold are not displayed. The threshold may be based on pixel intensity; time elapsed from last activity or any other reasonable quantity. This may also include a gradual curve or stepped result rather than an all or nothing approach. The threshold may be determined manually or automatically (e.g. based on remaining power). The threshold value or characteristics may depend on information relevance, pixel brightness, history of use (most frequently used items, most recently used items).

In block 245, the system may selectively dim pixels in a random or ordered manner. For example, when multimedia presentations are being displayed (e.g. a movie), the system may selectively dim pixels of the movie as determined by those parts of the animation judged to be of less importance to the movie (by algorithm or by content providers). In one example, those pixels outside of circle of radius R centered on the window (assuming that those items far from the center are less important; a circular window saves energy relative to a square or rectangular window), or those pixels that are not part of the actor (assuming that the actor and his facial expressions are key to the movie relative to background). Alternately, random pixels may be dimmed or turned off completely; these may be selected by a random number generator and an algorithm for selecting inactive pixels.

In block 250, actions based upon available power may be selected or implemented, preferably on a scale that varies with the amount of time remaining on the power supply or the amount of energy remaining in the power supply. In one example, a window or active region may slowly shrink when battery power is below a certain threshold. A window or active region may become porous (like, for example, Swiss cheese), with the pore spacing and size set by the user or the system. In another example, an edge detection filter may be applied to a movie, and the system displays only the edges of items—which saves considerable energy. This may also include still or moving images displayed in a browser window.

Although this invention focuses on displays, however, the active regions may refer to audio or include audio or other peripherals in its attempts to reduce power. For example, the audio may be modified to save power. For example, music may be eliminated from an audio broadcast or presentation, audio may be shut down completely or portions of the audio may be selectively filtered.

The "display" used herein may refer to a computer screen, stadium display, an advertisement display, kiosk, watch, head-mounted display, television, medical equipment, helmet displays, telephone displays or any other display on an electronic device. The relative brightness of regions on a display may be based on a user's history of past use—so that "important" material is brighter. Desktop icons, windows, or menu items may change brightness according to the most recently used, most frequently used, most likely to be used, most used by others in the company, most used by people in a geography or other demographic, etc. These features may be varied in brightness or color based upon levels of importance or usage. Items that are popular within a demographic may light up brightly, with intensity changing through time.

Users of this system may be given manual control in steps 210, 215 or 220 of FIG. 2. For example, the system or user may select from a plurality of possible window shapes to enhance power savings while maintaining utility and aesthetics for different tasks (e.g., circle, triangle, etc.).

Figure 7:
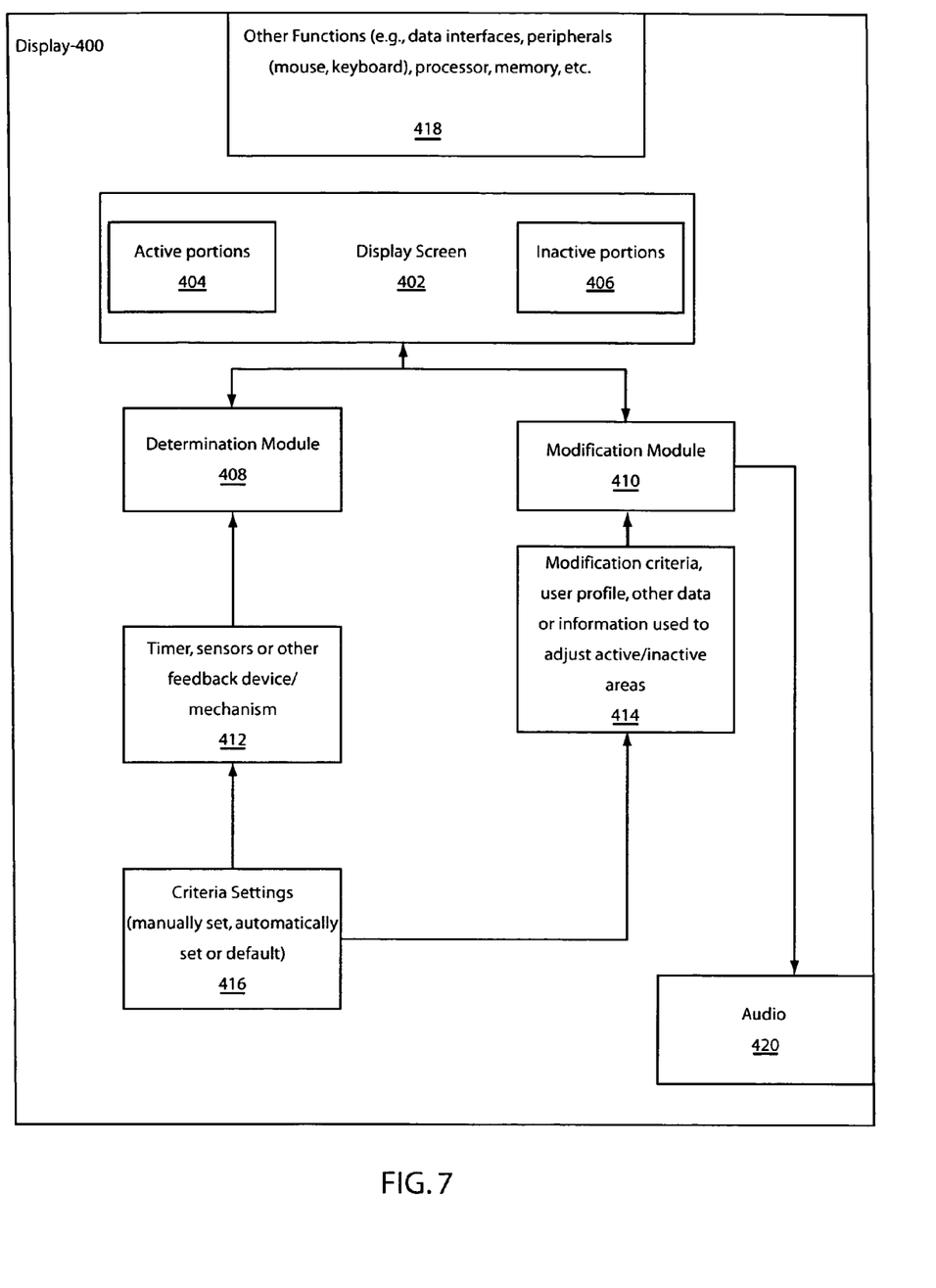
FIG. 7 is a block/flow diagram for a system/method for a display screen in accordance with one embodiment of the present invention.

Referring to FIG. 7, an illustrative display system 400 is shown, which may be employed to implement the present invention. The display 400 preferably includes a self-luminous display to benefit from the power saving effects of the present invention. However, any display with pixels may be employed. Display includes a display screen 402, which includes active regions or portions 404 and inactive regions or portions 406 during use. Active and inactive regions 404 and 406 can be assigned or determined by a determination module 408.

Determination module 408 may include a combination of hardware and/or software for determining which pixels are active and which are inactive. This determination may be made based upon feedback or other information collected for the conditions of the display, e.g., battery power, timers or sensors, as described above. Criteria for determining active versus inactive pixels may be based on stored criteria 416 such as factory default settings, user settings, or automatic setting based upon dynamic conditions (e.g., battery power).

A modification module 410 selectively modifies the active regions and/or the inactive regions of the display to save power by reducing energy consumption of the inactive portions while the active portions remain powered. This may be provided by one of the methods selected for power reductions as set forth above. Modification criteria 414 and criteria 416 may be employed to modify the type or magnitude of the adjustment of inactive pixels. Modification module 410 may implement various edge detection algorithms or other image processing techniques so as to reduce power in accordance with the present invention.

Audio device 420 may also be included and may be modified in accordance with the teachings of the present disclosure. For example, portions of the audio signals may be adjusted to conserve power.

Display 400 also includes other components 418 needed for implementing the present invention. These components may include interfaces for peripherals (mouse, keyboard, etc.) and the peripherals themselves, along with processing capabilities and memory.

Figure 8:
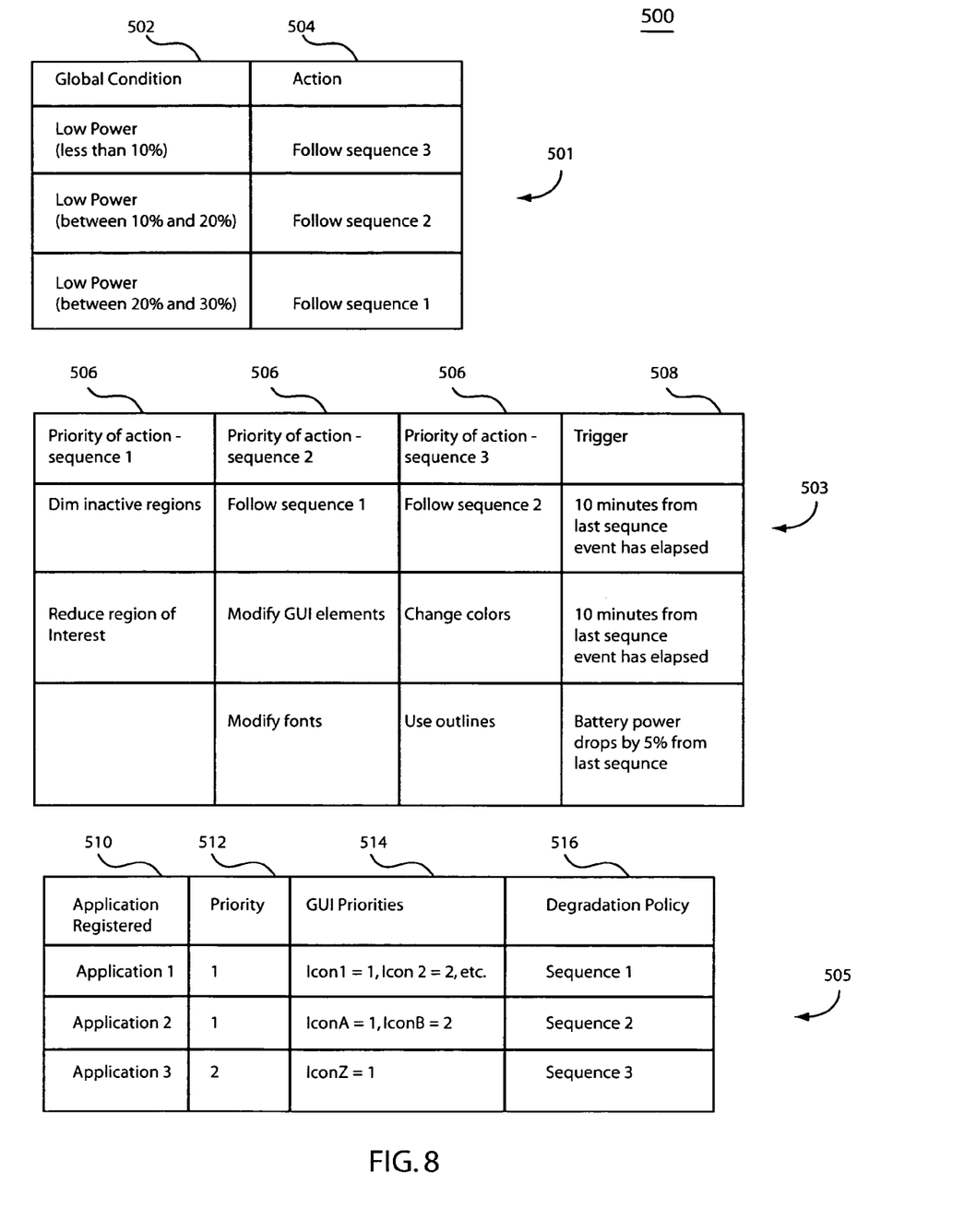
FIG. 8 is a policy table(s) showing priorities for applications and events that control the type and manner of power down of pixels in accordance with the present invention.

Referring to FIG. 8, an illustrative policy table 500 is shown in accordance with one embodiment of the present invention. Policy table 500 may be provided as a criteria setting(s) (e.g., in blocks 414 and 416 in FIG. 7). Policy table(s) 500 may include condition information 502 and corresponding actions 504 to be taken. In addition, table 500 may include a priority listing(s) 506 of actions to be taken. These actions may follow a sequence schedule where a different action is taken or is combined with previously taken actions. Triggering events 508 may also be recorded to indicate when a next action in the priority listing is to be taken for starting a change in an action or beginning an action.

Table 500 may be set up by a user or include default settings. These settings may be adjusted automatically or by the user. Message handlers may be set up in applications so that feedback and conditions may be reported to the operating system from different applications running on the system. The message handlers may include an illumination message handler, which controls the illumination characteristics of the display screen, etc. Applications can register 510 with this handler so that they may send a message that is controlled by the policy table 500. Each application may be assigned a priority 512, which sets forth which applications will be adjusted first. GUI or other screen properties 514 may also be ranked or assigned a priority. Each application may also include a degradation policy 516, which provides a sequence of steps or actions that can be carried out to reduce pixel illumination based on events or conditions at hand.

In one example, Application 3 has been inactive for a period of time. According to table 505 the degradation policy in 516 used to save power usage is sequence 3 in table 503. This policy includes all of the items in sequence two and sequence 1 of table 503. First inactive pixels are dimmed, followed by reducing to the screen to a region of interest, next modify GUI elements (this will in turn be performed in accordance with the GUI priorities in 514. Next, the fonts, colors and outlines are altered per sequence 2 and 3 in table 503. Each of these sequences may be triggered by a trigger event in 508. The trigger events may include elapsed time or battery power lost in a given period or simply remaining battery life. Other triggering events are possible as well. For example, if the sequence 1 event of dim inactive regions is executed in sequence 1 of table 503 and 10 minutes from the last sequence event elapses regions of interest are focused on as well since the triggering event in column 508 has been achieved.

In addition global conditions may be employed as shown in table 501. Action sequences 504 are performed when the global conditions 502 occur. It should be understood that a plurality of different data structures or schema may be employed to provide priority of applications and events to trigger different power savings techniques. FIG. 8 is merely an illustrative embodiment employed to describe one aspect of the present invention.

Having described preferred embodiments of an apparatus and method for display power saving (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A power saving method for self-luminous displays, comprising the steps of: determining active and inactive portions of a display screen;
   providing a user-configurable policy table to associate and prioritize system actions with power down criteria, wherein a selection is made from a plurality of different system actions and associated with the criteria related to system power conditions;
   modifying at least the inactive portions of the display screen in accordance with the criteria associated with the system power conditions to save power by reducing energy consumption of at least the inactive portions wherein the criteria is employed to reference the policy table to determine which of the system actions are to be taken to save power as the criteria changes, wherein the step of modifying includes setting a threshold value based on image characteristics in which all values beneath the threshold are dimmed or not displayed.

2. The method as recited in claim 1, wherein the step of determining includes determining inactive regions based upon elapsed time of nonuse.

3. The method as recited in claim 1, wherein the step of modifying includes adjusting at least one of a size, shape, and location of active and inactive portions.

4. The method as recited in claim 1, wherein the active portions maintain default settings or user-specified display characteristics and the step of modifying at least the inactive portions includes reducing a number or brightness of illuminated pixels in die inactive portions.

5. The method as recited in claim 1, wherein the active portions include a cognitive focus area as determined by one or more sensors.

6. The method as recited in claim 5, wherein the focus area is determined by any of biometrics, eye gaze, and brain waves.

7. The method as recited in claim 1, wherein the step of determining the active portions is dependent on a type of content being displayed.

8. The method as recited in claim 1, wherein the step of determining the active portions includes determining an integral number of characters, words, sentences or text lines near a center of focus or cursor.

9. The method as recited in claim 1, wherein die step of determining active portions includes controlling an active portion that the user moves around the screen display and wherein the inactive portions are outside the active portion.

10. The method as recited in claim 1, wherein the active portions are brighter than the inactive portions.

11. The method as recited in claim 1, wherein the step of determining the active portions includes at least one of a user preference profile, biometrics, and survey information.

12. The method as recited in claim 1, wherein the active portions' size, shape, location, and brightness is dependent on remaining power.

13. The method as recited in claim 1, wherein the step of modifying includes modifying active portions by showing only edges to conserve power.

14. The method as recited in claim 1, where the step of determining includes determining inactive portions in areas distant from a center of the screen, areas distant from a center of user attention, areas with static image content that has not changed for a period of time.

15. The method as recited in claim 1, wherein the step of modifying includes modifying graphical use interface (GUI) elements to save power.

16. The method as recited in claim 15, wherein the step of modifying graphical user interface elements includes one of fading, omission or size reduction of a title bar, frame, scroll bar, or icons.

17. The method as recited in claim 1, wherein the step of modifying includes changing to a power-savings font to reduce power within the active portions or within the inactive portions.

18. The method as recited in claim 17, wherein the power-savings font comprises at least one of reducing line width of a font eliminating features of a font, switching fonts, and applying a stipple pattern to turn off some fraction of the lit pixels.

19. The method as recited in claim 1, wherein overall brightness of image content is reduced.

20. The method as recited in claim 1 wherein the threshold is determined automatically based on current operating conditions of the display screen.

21. The method as recited in claim 1, wherein the threshold depends on one of information relevance, pixel brightness, and history of use.

22. The method as recited in claim 1, wherein the step of modifying includes selectively dimming pixels for rendering a data stream as determined by importance as determined by an algorithm or by content providers.

23. The method as recited in claim 1, wherein the step of modifying includes shrinking the active portions in accordance with battery power employed by the display screen.

24. The method as recited in claim 1, wherein the shrinking step includes making the active portions porous where pore size and spacing are selectively determined.

25. The method as recited in claim 1, wherein the active portions includes audio renderings and the method further comprises the step of modifying audio to save power.

26. The method as recited in claim 1, wherein the step of modifying includes adjusting relative brightness of pixels based on importance such that more important material is rendered brighter.

27. The method as recited in claim 26, wherein importance is based on one or more of most recently used areas, most frequently used areas, most likely to be used areas, most used by others in a group of users, most used by people in a geography or demographic.

28. The method as recited in claim 27, wherein items rendered on the display screen that are popular within a demographic light up more brightly than other portions, with intensity changing through time.

29. The method as recited in claim 1, wherein the step of modifying includes selecting an active region shape to enhance power savings.

30. A program storage device readable by machine, tangibly embodying a program of instructions executable by the machine to perform method steps for power saving in self-luminous displays as recited in claim 1.

31. A display apparatus, comprising a self-luminous display; a determination module configured to determine active regions and inactive regions based upon criteria; a modification module configured to selectively modify at least one of the active regions and the inactive regions of the display to save power by reducing energy consumption of at least one of the inactive portions and the active portions; and a user-configurable policy table to associate and prioritize system actions with power down criteria wherein a selection is made from a plurality of different system actions and associated with the criteria related to system power conditions such that the criteria is employed to reference the policy table to determine a plurality of user-selected prioritized actions to be taken to save power as the criteria changes; and a threshold value of pixel characteristics, which sets a point in which all values beneath the threshold are not displayed on the screen.

32. The apparatus as recited in claim 31, wherein the modification module includes information for determining size, shape, and location of active and inactive regions.

33. The apparatus as recited in claim 31, wherein active regions maintain default or user-specified display characteristics and wherein the inactive regions are modified to reduce power dissipation by reducing the number or brightness of illuminated pixels in the inactive regions.

34. The apparatus as recited in claim 31, wherein the active regions include at least one of a cognitive focus area as determined by one or more sensors.

35. The apparatus as recited in claim 34, wherein the extent of the active regions is dependent on a type of content in the region.

36. The apparatus as recited in claim 31, wherein the active regions include an integral number of characters, words, sentences or text lines near a center of focus or cursor.

37. The apparatus as recited in claim 31, wherein the active regions are user controlled to move around the screen and wherein the inactive regions are outside an active region.

38. The apparatus as recited in claim 31, wherein the active regions-are brighter than the inactive regions.

39. The apparatus as recited in claim 31, the active region's size, shape, location, and brightness depend on remaining stored power of the display.

40. The apparatus as recited in claim 31, wherein the active regions are determined by at least one of biometrics, eye gaze, and brain waves.

41. The apparatus as recited in claim 31, wherein the active regions show edges of images.

42. The apparatus as recited in claim 31, wherein the inactive regions are determined by one of inactive windows, areas distant from a center of the screen, areas distant from a center of attention, areas with static image content that has not changed in a period of time.

43. The apparatus as recited in claim 31, further comprising graphical user interface elements, which are changed to save power.

44. The apparatus as recited in claim 31, further comprising a power-savings font used to reduce power within or outside of the active regions.

45. The apparatus as recited in claim 44, wherein the power-savings font comprises at least one of reduced line width of the font, eliminated features of the font, different fonts, and a stipple pattern applied to turn off some fraction of the lit pixels.

46. The apparatus as recited in claim 31 wherein the threshold depends on information relevance, pixel brightness, or history of use.

47. The apparatus as recited in claim 31, wherein the active regions include a window, which slowly shrinks in accordance with battery power.

48. The apparatus as recited in claim 31, wherein the active regions include a window that becomes porous, the pore spacing and size being set by the user or the apparatus.

49. The apparatus as recited in claim 31, wherein active regions include audio rendering and the audio is modified to save power.

50. The apparatus as recited in claim 31, wherein relative brightness between features on the screen in both active and inactive regions is based on one or more of:
 importance, most recently used region, most frequently used region, most likely to be used region, region most used by a group of users, region most used by people in a geography or other demographic.

51. The apparatus as recited in claim 31, wherein the active regions include a shaped window to reduce active pixels and enhance power savings.

* * * * *

UNITED STATES PATENT AND TRADEMARK OFFICE
CERTIFICATE OF CORRECTION

PATENT NO.       : 7,614,011 B2                      Page 1 of 1
APPLICATION NO. : 10/970303
DATED            : November 3, 2009
INVENTOR(S)      : Karidis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this

Nineteenth Day of October, 2010

David J. Kappos
*Director of the United States Patent and Trademark Office*